United States Patent Office 3,354,081
Patented Nov. 21, 1967

3,354,081
PROCESS FOR DESULFURIZATION
EMPLOYING $K_2S$
Clyde L. Aldridge, Baton Rouge, La., assignor to Esso Research and Engineering Company, a corporation of Delaware
No Drawing. Filed Sept. 1, 1965, Ser. No. 484,425
4 Claims. (Cl. 208—235)

ABSTRACT OF THE DISCLOSURE

Sulfur compounds are removed from petroleum residuum by contacting with $K_2S$ at elevated temperature.

---

This invention relates to a process for the removal of sulfur from liquid hydrocarbon streams, particularly petroleum residuums. More specifically, the invention relates to the desulfurization of petroleum residuums with potassium sulfide.

Generally, sulfur occurs in petroleum stocks in one of the following forms: mercaptans, sulfides, disulfides and as part of a more or less substituted ring, of which thiophene, benzothiophene and dibenzothiophene are the prototypes. The mercaptans are generally found in the lower boiling fractions, e.g., the naphtha, kerosene and light gas oil. Numerous processes for sulfur removal from these lower boiling fractions have been suggested, such as "doctor" sweetening (wherein mercaptans are converted to disulfides), caustic treating, solvent extraction, copper chloride treating, etc., all of which give a more or less satisfactory decrease in sulfur or inactivation of mercaptans by their conversion into disulfides. When the process results in the latter effect the disulfides generally remain in the treated product and must be removed by another step if it is desired to obtain a sulfur-free product.

Sulfur removal from higher boiling fractions, however, has been a much more difficult operation. Here the sulfur is present for the most part in the less reactive forms as sulfides, disulfides and as a part of a ring compound, such as substituted thiophenes. Such sulfur is, of course, not susceptible to chemical operations satisfactory for removal of mercaptans. Extraction processes employing sulfur-selective solvents are also unsatisfactory because the high boiling petroleum fractions contain such a high percentage of sulfur-containing molecules. For example, even if a residuum contains only about 3% sulfur, it is estimated that substantially all the molecules may contain sulfur. Thus, if such a residuum were extracted with a solvent selective to sulfur compounds, the bulk of the residuum would be extracted and lost.

A process for the chemical desulfurization of residuum stocks employing fused alkali metal hydroxides has been disclosed by Mattox in U.S. Patent 3,164,545, issued Jan. 5, 1965. While contaminant removal is excellent using fused alkali metal hydroxides, the process suffers from the inherent defect that the treating agent becomes spent and it must be regenerated in a multistep regeneration sequence.

The object of this invention is to provide a process for the desulfurization of residuum in which regeneration can be achieved by a single regeneration step in a simple and straightforward manner. I have found that $K_2S$ is an effective chemical desulfurization reagent.

The invention will be further illustrated by the following description and examples.

Generally speaking, the process involves contacting the oil at elevated temperature with $K_2S$ and regenerating the KSH formed in the desulfurization step with steam or an inert stripping gas.

The desulfurization feedstock comprises a heavy hydrocarbon oil containing an appreciable quantity of sulfur compounds, i.e., from 0.5 to 10.0 wt. percent sulfur. Specific examples include heavy whole crude oils, topped crude oils, atmospheric residuums, vacuum residuums, shale oils and the like.

The petroleum residuum is contacted in any suitable reaction vessel, preferably a vessel lined with graphite, ceramics or other corrosion resistant materials. Reaction conditions include temperatures ranging from 300°–1000° F., preferably 500°–800° F. Atmospheric or elevated pressure, i.e., .01–500 p.s.i.g., can be used. The quantity of $K_2S$ will range from 10–100 wt. percent based on the feed. Treating times range from 10 minutes to 20 hours. Continuous or batch contacting can be used.

The amount of water associated with the $K_2S$ is important. The water content should be within the range of from about 5–30 wt. percent based on $K_2S$.

The reaction may be improved by passing air or oxygen into the reactor during the reaction or preferably by pre-oxidizing the petroleum feedstock. Air rates of 1–1500 std. cubic feet per barrel can be used. If the feedstock is pre-oxidized, contacting temperatures ranging from 200°–800° F. and contacting times ranging from 10 minutes to 10 hours are suitable.

Example 1

To a 2-liter stirred autoclave equipped with nickel liner were added 167.0 g. of West Texas atmospheric residuum (1.31% S) which had been partially oxidized with air for 4 hours at 600° F., together with 193.3 g. of $K_2S \cdot H_2O$. The mixture was heated in the sealed autoclave with stirring to a temperature of 650° F. and maintained at this temperature with stirring for a period of 4 hours. After cooling to room temperature the residuum was dissolved in benzene and separated from the solid reagent. Evaporation of the benzene solvent yielded a residuum with 0.80% sulfur content. Thus, 39% sulfur removal was achieved.

Example 2

A run similar to Example 1 was made in which 200 g. of residuum was treated with 303 g. of $K_2S \cdot 3.6\ H_2O$. In this case sulfur removal was 17%.

Example 3

A run similar to Example 1 was made in which 180 g. of residuum was treated with 205 grams of $K_2S \cdot H_2O$ in an autoclave equipped with a graphite liner. After extraction with benzene, water washing and evaporation of solvent the residuum showed sulfur removal of 42%.

The effect of water on the reaction is shown by the following table which gives the results of treating West Texas deasphalted vacuum residuum at 650° F. for 4 hours.

TABLE 1

| | | | | | |
|---|---|---|---|---|---|
| Wt. percent of $H_2O$ of Hydration | 14.0 | 14.0 | 18.1 | 23.0 | 37.0 |
| Moles of $H_2O$ of Hydration | 1.0 | 1.0 | 1.35 | 1.83 | 3.6 |
| Desulfurization, percent | 39 | 42 | 33 | 23 | 17 |

It can be seen that more than 30% desulfurization is achieved when about 1.35 moles of water of hydration are present in the reaction mixture. This degree of desulfurization compares favorably with KOH treating.

$K_2S$ is converted to KSH in the reaction. KSH is readily converted to $K_2S$ by contacting with steam at a temperature in the range of 400 to 1000° F. and at pressures ranging from atmospheric to 500 p.s.i. Other means known in the art for converting KSH to $K_2S$ may be used.

$H_2S$ produced in the regeneration of KSH can be converted to sulfur or sulfuric acid by reactions known in the art.

What is claimed is:

1. A process for removing sulfur from a petroleum residuum containing 0.5 to 10.0 wt. percent sulfur in the form of sulfides, disulfides and sulfur substituted ring compounds comprising contacting the residuum with a treating agent consisting of 10–100 wt. percent $K_2S$ based on the fed in the presence of 5–30 wt. percent water based on $K_2S$, at contacting conditions including a temperature in the range of 500–800° F. and recovering a desulfurized residuum.

2. Process according to claim 1 in which the residuum is preoxidized prior to contacting with $K_2S$.

3. An improved continuous process for removing sulfur from petroleum residuums containing 0.5 to 10.0 wt. percent sulfur in the form of sulfides, disulfides and sulfur substituted ring compounds comprising the steps of contacting the residuum with a treating agent consisting of $K_2S$ at a temperature in the range of 300–1000° F. in the presence of 5–30 wt. percent $H_2O$ based on $K_2S$, separating desulfurized residuum from the spent $K_2S$ treating agent, contacting spent $K_2S$ treating agent with steam at a temperature in the range of 400 to 1000° F., recovering regenerated $K_2S$ treating agent and recycling the treating agent to the residuum contacting step.

4. Process according to claim 3 in which the contacting is carried out in the presence of an oxygen-containing gas.

References Cited
UNITED STATES PATENTS

| | | | |
|---|---|---|---|
| 1,300,816 | 4/1919 | Cobb | 208—236 |
| 1,413,005 | 4/1922 | Cobb | 208—236 |
| 1,940,726 | 12/1933 | Morrell | 208—226 |
| 2,020,661 | 11/1935 | Schulze et al. | 208—226 |
| 3,051,645 | 8/1962 | Wilson et al. | 208—230 |

SAMUEL P. JONES, *Primary Examiner.*